3,487,194
SONIC APPARATUS FOR THE IRRADIATION OF WELD FUSION ZONES
Curt A. Poulton, Florissant, and Cline W. Lovellette, St. Charles, Mo., assignors, by mesne assignments, to McDonnell Douglas Corporation, St. Louis County, Mo., a corporation of Maryland
Filed May 31, 1966, Ser. No. 554,016
Int. Cl. B23k 9/00, 9/16, 35/38
U.S. Cl. 219—128         4 Claims

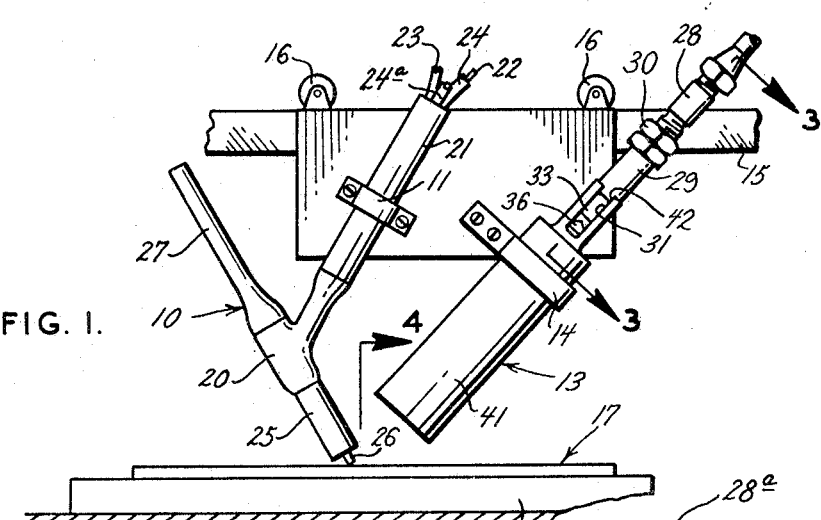
FIG. 1.
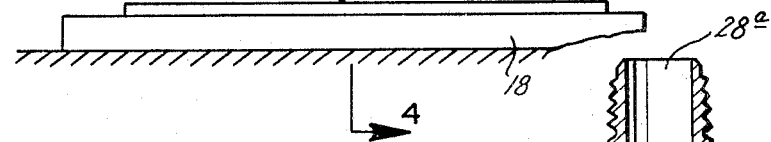
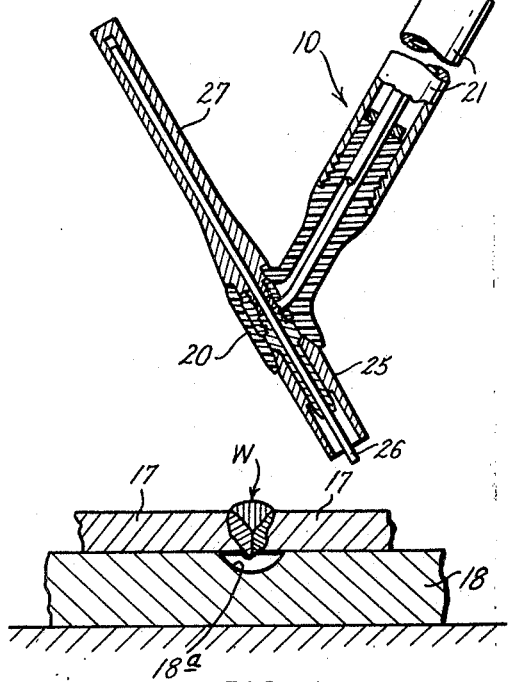
FIG. 2.
FIG. 4.
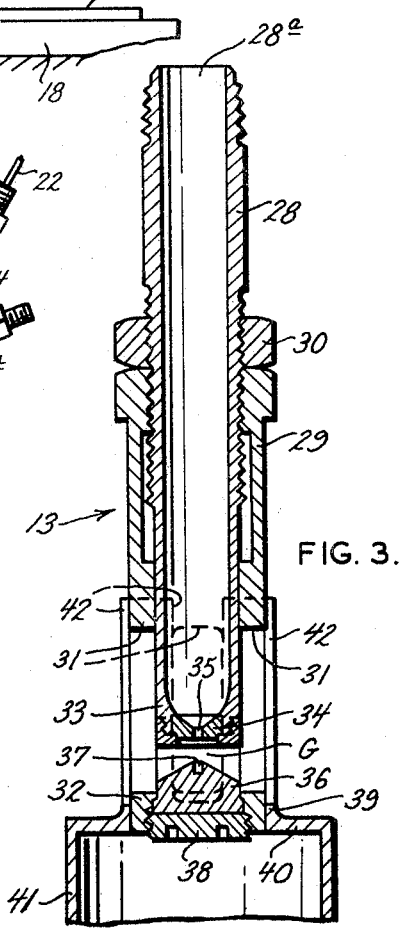
FIG. 3.
INVENTORS
CURT A. POULTON
CLINE W. LOVELLETTE
BY Gravely, Lieder & Woodruff
ATTORNEYS

ABSTRACT OF THE DISCLOSURE

Apparatus for sonic irradiation of weld melt zones and the method therefor, comprising transmitting by means of an air couple high frequency sound vibrations into a weld melt zone for the purpose of controlling grain characteristics and strength of the welded zone.

---

This invention relates to sonic apparatus for the irradiation of weld fusion zones.

The problems with welding include loss of strength in the weld, lack of uniform and refined grain in the weld zone compared to grain in the base metal, change of heat treatment of base metal and the requirement of filter metal bead being thicker than base metal. The present invention is directed toward providing novel means for overcoming the above problems, such that welds are reduced in size, are substantially as strong as the base metal, and have a refined grain structure.

The solidification of molten metal as in weld puddling or casting involves a crystal growth phenomenon. As the molten metal cools, nucleic crystals form and grow until a mushy condition exists in which the crystalline solids are surrounded by metal which is still in a molten state. As the cooling continues and the crystals grow, the interstices close up, but the individual crystals do not join. Rather, the crystals assume a condition in which they are held together by a sort of a binder coating, thereby allowing the crystals to take on a trunk-and-branch appearance which is a familiar dendritic or tree-like appearance. The dendrites most commonly occur in straight lines and are always normal to the surface of the molten mass. The orientation of the dendrites is a cause of trouble and loss of strength of welded joints as the planes of weakness occur at intersections of the dendritic planes.

If two identical specimens are subject to tungsten-inert gas weld melt and no filter material is introduced, but one of the specimens is subject to sonic irradiation and the other is not, the one not subject to sonic irradiation will very clearly show linearity of crystalline make-up. The specimen subject to sonic irradiation will show a clear crystalline structure in which the dendrites show considerably less directionality. The crystal size does not seem to be affected, but the shear planes which are so common to the usual dendritic patterns are gone, while grain boundary definitions seem to be left intact, indicating that no major chemistry changes have occurred.

There is a dramatic improvement in strength as between the specimen subject to sonic irradiation and the specimen which has not been subject to irradiation. This is attributed to lessening of the normal stratified construction or area of the crystals in a non-irradiated weld, since non-directionally improves strength by robbing the weld of convenient shear paths in which shearing failures might occur. It is believed that with the reduction or limitation of dendritic linearity the planes of weakness at the usual intersection of the crystal structure will not occur, and improved strength is promoted because of the homogeneity of the crystalline structure. It is recognized that the action which takes place in welding of metals is very complex, and that the foregoing is only intended to present a brief discussion for the following disclosure of apparatus by which sonic irradiation may be developed.

It is an important object of this invention to provide smiple apparatus for greatly improving welding base metals with stronger and more stable welds.

It is also an important object of this invention to provide welding apparatus that will be useful in the welding of non-ferrous metals, as well as the ferrous metals.

A further object of the invention is to provide apparatus for treating welds in such a manner that tendencies for well defined shear planes to form will be broken up, thereby greatly improving the strength of the welds.

Yet another object of the invention is to provide welding apparatus with sonic or ultrasonic means which will vibrate and diffuse the molten material in the weld area to improve grain structure and reduce the formation of shear planes.

It is still another object of the invention to provide a method of improving and strengthening welded workpieces by irradiating the weld melt with the application of ultrasonic energy.

Other objects and advantages of the present invention will be set forth in the following disclosure of the parts, components and combinations thereof, reference being had to the accompanying drawings, wherein:

FIG. 1 is an elevational view of one form of apparatus useful for practicing the invention;

FIG. 2 is a sectional view on an enlarged scale of the welding torch shown in FIG. 1;

FIG. 3 is a sectional view on an enlarged scale of the ultrasonic means shown in FIG. 1; and FIG. 4 is a sectional view taken at line 4—4 in FIG. 1.

The apparatus for practicing this invention is generally shown in FIG. 1 and comprises a welding torch 10 mounted by a suitable bracket 11 to a carriage 12, and a sonic horn 13 also mounted by a suitable bracket 14 on the carriage 12. The carriage 12 is mounted on a track 15 by rollers 16 to permit movement of the carriage 12 in a direction to traverse the workpieces 17 to be welded. The workpieces 17 in this case selected for illustration to be butt fusion welded are mounted on a table or support 18 during the welding operation, such support or platen having a groove 18a for the channelling of inert gas along the underside of weld W to prevent oxidation in the cases where the melt fully penetrates the thickness of the workpieces 17. It is, of course, contemplated that the carriage 12 can be stationary and workpieces 17 can be moved past the welding torch 10 and sonic horn 13.

The welding torch 10 seen in FIG. 2 comprises a body 20 formed with a tubular handle 21 through which the electrical power cable 22, inert gas conduit 23 and the cooling fluid hoses 24 and 24a are run into the body 20. The torch 10 is provided with an end cup 25 which surrounds the tip end of electrode 26. The electrode 26 extends through the body 20 and is housed in an elongated cap 27.

In FIG. 3 there is shown the sonic horn 13 which includes a tubular sleeve 28 threaded into a resonator barrel 29. The barrel and sleeve are held in adjustment by a lock nut 30. Opposite the lock nut 30 the barrel 29 is fomed with circumferentially spaced slots or windows 31 of axially elongated form, and the end of the barrel is formed with circumferentially spaced slots or windows the sleeve 28 is threadedly mounted in the barrel 29 so that its inner end 33 can be adjusted axially relative to the resonator. The end 33 of the sleeve is formed to support an ejector nozzle 34 having a predetermined sized passage 35 formed thereto. A resonator plug 36 is axially spaced from the ejector 34 a predetermined distance G and plug 36 has a recess or cavity 37 having a diameter to match the diameter of the passage 35. The resonator plug 36 is removably mounted in the ring 32 of the barrel 29 and is locked into position by a cap nut 38, although it could be removably held in the ring 32 by a diametrical key or locking pin (not shown). The assembly thus described is slideably mounted in a tubular extension 39 which projects outwardly from the base wall 40 of a sound directing horn 41. The extension 39 is sized to slideably receive the ring 32 of the barrel 29 so that the cap nut 38 of the resonator plug 36 is positioned in the base wall 40 of the horn 41. The extension 39 is provided with a plurality of elongated slots 42 which are equal in number to the windows 31 in the barrel 29, thereby opening up the area between the orifice 34 and the resonator plug 36 to atmosphere.

In the operation of the oscillating horn as shown and described in FIG. 3, a suitable source of air under pressure is connected to the inlet end 28a of the sleeve 28. The pressure supply may vary from as low as approximately 20 p.s.i. to as much as 70 p.s.i. In one preferred form of apparatus the air pressure found to yield excellent results was approximately 35 p.s.i. It is known that the air under pressure supplied through the sleeve 28 is ejected through the orifice 35 at supersonic velocity and the issuing stream of air is centered in the cavity 37 of the oscillator plug 36. The air under pressure creates shock fronts which pile up in the region of the gap G which reverberate between the cavity 37 and the orifice 35. The air in this gap space G in front of cavity 37 will then pulsate with a frequency which will generate the desired sound within the horn 41, and the horn 41 is then utilized to control and direct the high energy sound waves into the zone of the fusion weld which is maintained by the electrode 26. Since the welding torch also delivers inert gas, such as argon, to the zone of the fusion weld, it is important that the sound issuing from the open end of the horn 41 not be released over a large area otherwise it will blow the inert gas away from the welding zone and the metal of the workpiece 17 will be exposed to the air.

In a structure of the type shown and described in FIG. 3 it is known that the air in the cavity 37 will pulsate with a frequency:

$$f = \frac{c}{\lambda} = \frac{c}{4(l+0.3d)}$$

in which $c$ is the sound velocity in the gas, and $l$ and $d$ are the depth and diameter of the cavity 37. The power output of such a resonant jet of air is:

$$W = 3d^2(P_e - 0.9)^{1/2} \text{ watts}$$

where $d$ is the diameter of both the jet orifice or jet passage 35 and the resonator cavity in millimeters, and $P_e$ is the upstream pressure in atmospheres ($P_e$ being greater than 0.9 atmospheres). In a device of the foregoing character supersonic flow takes place in the passage 35, hence the device will generate sonic oscillations in the ultrasonic range.

In FIG. 3 it is shown that the ejector 34 and resonator 36 are removably mounted. This is advantageous as it allows for changing these elements so that different sound frequencies may be obtained. As stated, the orifice 35 and cavity 37 have matching diameters, thus one matched set of these elements may be used to produce a sound level of about 150 decibels at a frequency of 16,000 cycles per second, and another set may be used for a different effect, say 160 decibels at a frequency of 20,000 c.p.s. Tests have shown that these results are out of the audible range for humans, and that there is a pronounced decay of the noise as it travels away from the zone of welding.

The use of the foregoing apparatus is made particularly attractive in weld fusion zones where the molten metal can be irradiated with ultrasonic or high frequency sonic vibrations. The sound energy is carried to the molten metal by an air couple within the limits of the horn 41. This eliminates a great many of the problems which have heretofore existed in connection with weld vibrating apparatus where the vibratons have been transmitted mechanically through the workpiece, with the associated inefficiency resulting from the large mass thereof. The mechanical transmission of the sound energy also leads to problems of maintaining operation of the welding torch as well as problems of maintaining accuracy of the weld when butt welded seams of any great length are required.

Macrophotographs of polished and etched weld specimens have shown that sonic irradiation increases the fineness of the grain structure, makes the grain boundary cleaner, and has raised the tensile and ultimate strength significantly as compared to non-irradiated welds. All known prior attempts at direct transmission of high frequency sound have failed to show worthwhile improvements, due largely to difficulty encoutered in the mechanical vibration of work pieces, their great masses robbing the weld melt of sufficient energy to be useful. A significant improvement in the foregoing apparatus is the direct method of introducing vibrations into the weld zone through an air couple which is controlled in its direction and area of coverage by the horn 41.

The foregoing specification has set forth in detail a preferred form of apparatus for practicing the invention, although changes and modifications may be made in various parts and components thereof without departing from the spirit and scope of the invention as it may be defined in the appended claims.

What is claimed is:

1. Apparatus for sonic irradiation of weld melt zones in workpieces comprising: means to support workpieces in adjacent relation for connection by fusion welding; a welding torch having an electrode to maintain an arc for reducing the material of the workpieces to the molten state; means for supplying an inert gas to the zone of the molten material; and sonic irradiation producing means adjacent the molten material zone, said sonic means including a horn having a closed end and an opposite end opening toward said molten material zone to connect said zone and said sonic means by an air couple and said horn comprising a sonic generator consisting of a barrel member having openings adjacent one end and an end ring at said openings, a resonator element mounted by said ring adjacent said openings, a sleeve adjustably carried by said barrel member with one end adjacent said openings, and an ejector element mounted in said one end of said sleeve.

2. Apparatus for sonic irradiation of weld melt zones in workpieces comprising: means to support workpieces in adjacent relation for connection by fusion welding; a welding torch having an electrode to maintain an arc for reducing the material of the workpieces to the molten state; means for supplying an inert gas to the zone of the molten material; and sonic irradiation producing means adjacent the molten material zone, said sonic means including a horn having a closed end and an opposite end opening toward said molten material zone to connect said zone and said sonic means by an air couple and an ejector element having an orifice therethrough, a spaced resonator element having a cavity aligned with said orifice, a source of air under pressure connected to said ejector element, and means supporting said ejector and resonator elements in spaced relation open to ambient atmosphere and supporting said resonator element in said closed end of said horn.

3. Apparatus according to claim 2 wherein said ejector and resonator elements have matching sizes of orifice and cavity, and said elements are removably mounted for replacement by other elements having matching sizes of orifice and cavity different from said first named elements.

4. Apparatus for sonic irradiation of weld melt zones in workpieces comprising: means to support workpieces in adjacent relation for connection by fusion welding; a welding torch having an electrode to maintain an arc for reducing the material of the workpieces to the molten state; means for supplying an inert gas to the zone of the molten material; and sonic iradiation producing means adjacent the molten material zone, said sonic means including a horn having a closed end and an opposite end opening toward said molten material zone, the open end of said horn being positionable in spaced relation to the zone of molten material, and means adjacent the closed end of said horn operable to generate sonic pulses, said horn acting to connect said molten material zone and said sonic irradiation producing means by an air couple.

References Cited

UNITED STATES PATENTS

| 2,283,285 | 5/1942 | Pohlman | 310—8.1 X |
| 2,638,567 | 5/1953 | Cronin. | |
| 1,452,936 | 4/1923 | Schuman | 219—72 |
| 2,908,801 | 10/1959 | Cresswell | 219—74 |

FOREIGN PATENTS 875,035  8/1961  Great Britain.

JOSEPH V. TRUHE, Primary Examiner

R. F. STAUBLY, Assistant Examiner

U.S. Cl. X.R.

219—72; 29—503; 116—137

PO-1050
(5/69)

UNITED STATES PATENT OFFICE
CERTIFICATE OF CORRECTION

Patent No. 3,487,194           Dated December 30, 1969

Inventor(s) Curt A. Poulton and Cline W. Lovellette

It is certified that error appears in the above-identified patent and that said Letters Patent are hereby corrected as shown below:

Column 1, line 27, at the beginning of the line, change "filter" to "filler"

Column 1, line 51, after "no", change "filter" to "filler"

Column 2, line 64, after "is" at the beginning of the line, change "fomed" to "formed".

Column 2, line 66 and line 67 should be cancelled and the following substituted therefor: "is in the form of a ring 32. It has bee pointed out that the sleeve 28 is threadedly mounted in the barrel 29 so"

Column 4, line 22, after "difficulty" change "encoutered" to "encountered".

Column 4, lines 29, to 34 - These lines were cancelled during the prosecution of the application by Patent Office Paper No. 7.

SIGNED AND
SEALED
JUN 16 1970

(SEAL)
Attest:

Edward M. Fletcher, Jr.
Attesting Officer

WILLIAM E. SCHUYLER, JR.
Commissioner of Patents